United States Patent [19]
Rask

[11] Patent Number: 6,032,650
[45] Date of Patent: Mar. 7, 2000

[54] METHOD FOR CLOSED-LOOP CONTROL OF INJECTION TIMING IN COMBUSTION ENGINES

[75] Inventor: Patrik Rask, Åmål, Sweden

[73] Assignee: Mecel AB, Sweden

[21] Appl. No.: 09/180,660

[22] PCT Filed: May 4, 1998

[86] PCT No.: PCT/SE98/00811

§ 371 Date: Nov. 12, 1998

§ 102(e) Date: Nov. 12, 1998

[87] PCT Pub. No.: WO98/51922

PCT Pub. Date: Nov. 19, 1998

[30] Foreign Application Priority Data

May 12, 1997 [SE] Sweden .................................. 9701780

[51] Int. Cl.[7] .................................................. F02D 41/40
[52] U.S. Cl. ...................................... 123/435; 123/406.26
[58] Field of Search .............................. 123/435, 406.23, 123/406.26, 406.24, 406.37; 73/35.08, 116, 117.3

[56] References Cited

U.S. PATENT DOCUMENTS

| | | | |
|---|---|---|---|
| 4,535,740 | 8/1985 | Ma .......................................... | 123/435 |
| 5,253,627 | 10/1993 | Miyata et al. ........................... | 123/435 |
| 5,425,339 | 6/1995 | Fukui .................................. | 123/406.26 |
| 5,755,206 | 5/1998 | Takahshi et al. .................. | 123/406.37 |
| 5,769,049 | 6/1998 | Nytomt et al. ........................... | 123/435 |
| 5,803,047 | 9/1998 | Rask ................................... | 123/406.37 |
| 5,904,127 | 5/1999 | Kemmler et al. ........................ | 123/295 |
| 5,941,213 | 8/1999 | Ishii et al. ............................. | 123/406.2 |

Primary Examiner—Willis R. Wolfe
Assistant Examiner—Hieu T. Vo
Attorney, Agent, or Firm—Ostrolenk, Faber, Gerb & Soffen, LLP

[57] ABSTRACT

A method for closed-loop control of the positioning of a predetermined fuel amount in the working cycle of a combustion engine of the Otto-type, in which a predetermined amount of fuel is supplied to the combustion chamber via an injector and the ignition of the air-fuel mixture is initiated after the fuel has been supplied by using a spark plug arranged in the combustion chamber. With a biased measuring gap arranged in the combustion chamber, a measuring voltage $U_{ION}$ is obtained which corresponds to the degree of ionization during the flame ionization phase. A parameter, $dU_{ION}/dt$, characteristic for the basic frequency in the measuring voltage during the flame ionization phase is detected, which parameter could be used in order to indicate if an initiated correction of the injection timing is correct, that is, if the basic frequency increases, the timing is correct and is incorrect if the basic frequency decreases. Preferably, the basic frequency is detected by derivation of the measuring voltage during the period A, B, C, or D, said derivation initiated by reference to time t or crankshaft angle VC, i.e., $dU_{ION}/dt$ or $dU_{ION}/dVC$, respectively.

29 Claims, 5 Drawing Sheets

METHOD FOR CLOSED-LOOP CONTROL OF INJECTION TIMING IN COMBUSTION ENGINES

BACKGROUND OF THE INVENTION

The present invention relates to a method for closed-loop control of injection timing in combustion engines, based upon analysis of the characteristics of the ionisation current as detected via a measuring gap arranged within the combustion chamber.

Lambda sensors are often used in order to obtain closed loop control of stochiometric combustion in combustion engines. A stochiometric combustion is the ideal operation mode for a conventional three-way catalytic converter. The type of lambda sensors used in mass-produced cars have been a so-called narrow-banded lambda sensor, which type of sensors exhibit a distinct transition as of its output signal at a lambda value just below 1.0. This type of narrow-banded lambda sensor is used in order to control the combustion, wherein the control is operated such that the output signal of the lambda sensor switches between a low or high output signal.

An alternative to the narrow-banded lambda sensors is the linear type of lambda sensors, but these sensors are very expensive, at least 10-fold, and could therefore in terms of cost not justify an introduction in mass-produced cars. The linear type of lambda sensors emits an output signal proportional to the present air/fuel ratio. By using lambda sensor of the kind mentioned above, the amount of fuel being supplied could be controlled, in order to maintain a defined air/fuel ratio, i.e. A/F-ratio (Air/Fuel).

An alternative to lambda sensors is shown in U.S. Pat. No. 4,535,740 having an ion current sensor in the combustion chamber where the spark gap of the conventional spark plug is used as measuring gap enabling detection of the burn duration within the combustion chamber. A parameter representative of the burn duration, and thus the air/fuel ratio, is detected by measuring the length of time the ion current signal is above a predetermined threshold value. At certain operating ranges where the ion current signal exhibit a low accuracy, the closed loop control is based upon the termination of the burn duration. The characteristics of the burn duration vary considerably at different operating cases, i.e. load and rpm's, and for that reason alone there is a need for a number of different threshold values to be used for the detection of burn duration, or alternatively of using different weight factors for different load cases.

In U.S. Pat. No. 5,425,339 another closed-loop system is shown, wherein information from the ionisation current is used in order to control ignition timing and the amount of fuel being supplied, i.e. the present A/F ratio. In this implementation the product of the duration of the ionisation signal and the peak value is maximised, during variation of the fuel amount being supplied or alternatively during variation of the ignition timing. By duration of the ionisation signal is meant the time the ionisation current exceeds a predefined threshold level. In an alternative embodiment the integrated value of the ionisation current signal could be maximised during variation of either the fuel amount or the ignition timing.

In U.S. Pat. No. 5,425,339 is also shown (FIG. 5) a previously known system configuration, wherein also the injection timing could be controlled in a conventional manner. This conventional manner uses a feed-forward model, using empirically determined matrices for the injection timing, wherein the dominating parameters such as rpm, load and temperature all determine the present injection timing. Nothing in U.S. Pat. No. 5,425,339 suggests that the injection timing should be controlled in a closed-loop manner dependent on the ionisation current signal.

In SE,C, 503900 is shown an alternative for detecting the present A/F-ratio. Instead of using the duration of the ionisation current signal in order to determine the A/F ratio, as shown in U.S. Pat. No. 4,535,740, it is suggested in SE,C,503900 that a parameter extracted from the ionisation current signal and typical for a basic frequency content instead be used for this A/F detection. As an alternative the derivative of the ionisation current signal during the flame ionisation phase could be used, which derivative value is directly dependent an the basic frequency content of the ionisation current signal.

Further stringent demands on reduced emission levels have resulted in combustion engines being operated with ultra lean air-fuel mixtures, as seen globally in the entire combustion chamber, and wherein a stratification of the air-fuel mixture is needed with a richer mixture locally around the ignition plug. With combustion engines having direct injection this stratification could be obtained, by injecting the fuel amount in the vicinity of the spark plug shortly before initiating the ignition. By this stratification technique, so called stratified charge, combustion could be initiated properly with an ideal A/F ratio in the spark plug gap for the present operating conditions. Even though extensive testing and evaluation is performed in order to determine when the fuel is to be injected into the operating cycle of the engine, a problem will occur because different engines behave differently in aspects of how the fuel mixture moves inside the combustion chamber during different rpm's and loads. This could result in an ideal A/F-ratio not being obtained in the spark plug gap when ignition is to be initiated.

For example, in certain engines irregularities in the inlet manifold, caused by residual burrs from casting of the manifold, could have an impact upon the air flow into the combustion chamber such that the developed horizontal rotation (i.e. swirl), or the vertical rotation (i.e. thumble), is not developed in the same manner between cylinders.

During regular production also different engines could obtain different air flow into the combustion chambers, in comparison to the reference engine or engines being used in order to determine when fuel is to be injected into the combustion chamber. Different operating conditions with regulated amount of recirculated exhaust gases, so called EGR-control, could also have an uncontrolled impact upon the air motion between successive combustion's and also cause a gradual change in the order of impact in the long run.

If the timing of fuel injection into the combustion chamber is determined in such a manner that the fuel cloud deposited after finished injection should move a certain distance within the combustion chamber, by assistance of the developed air motion within the combustion chamber and before the fuel cloud reaches the ignition plug and ignition is initiated, then it is of extreme importance that the air motion is controlled. If the air motion is subjected to large variations between different cylinders but also between different operating conditions, then also the injection timing must be adapted to the existing air motion of the cylinder and present operating condition.

SUMMARY OF THE INVENTION

An object of the invention is to obtain a closed loop control of the injection timing in combustion engines with direct injection, whereby the optimum air-fuel mixture could be maintained in the spark plug gap at the timing of ignition.

Another object is to provide a method and system capable of altering the injection timing in Otto-engine with direct injection, such that the engine and each individual cylinder of the engine could be controlled as close as possible towards the lean limit.

Yet another object is to provide a method wherein a reliable ignition of the air-fuel mixture in the cylinder is obtained and where the likelihood for misfires and of exhaust of unburned fuel is minimised. This is necessary in order not to subject catalytic reactors to excessive temperatures and subsequent destruction thereof, which could lead to non acceptable levels of emissions from the engine.

Other distinguishing features and advantages will appear from the and the following description of preferred embodiments when read in conjunction with the accompanying drawings. embodiments are made by reference to the figures specified in the following list of figures.

DESCRIPTION OF EXEMPLARY EMBODIMENTS

In SE,C,503900 is shown an ignition system having the necessary measuring circuits in order to obtain an ionisation current signal from the combustion, which signal is used in the inventive method. The following description is identical with the description in SE,C,503900 as of the ignition system and the measuring circuits thereof.

Figure 1:
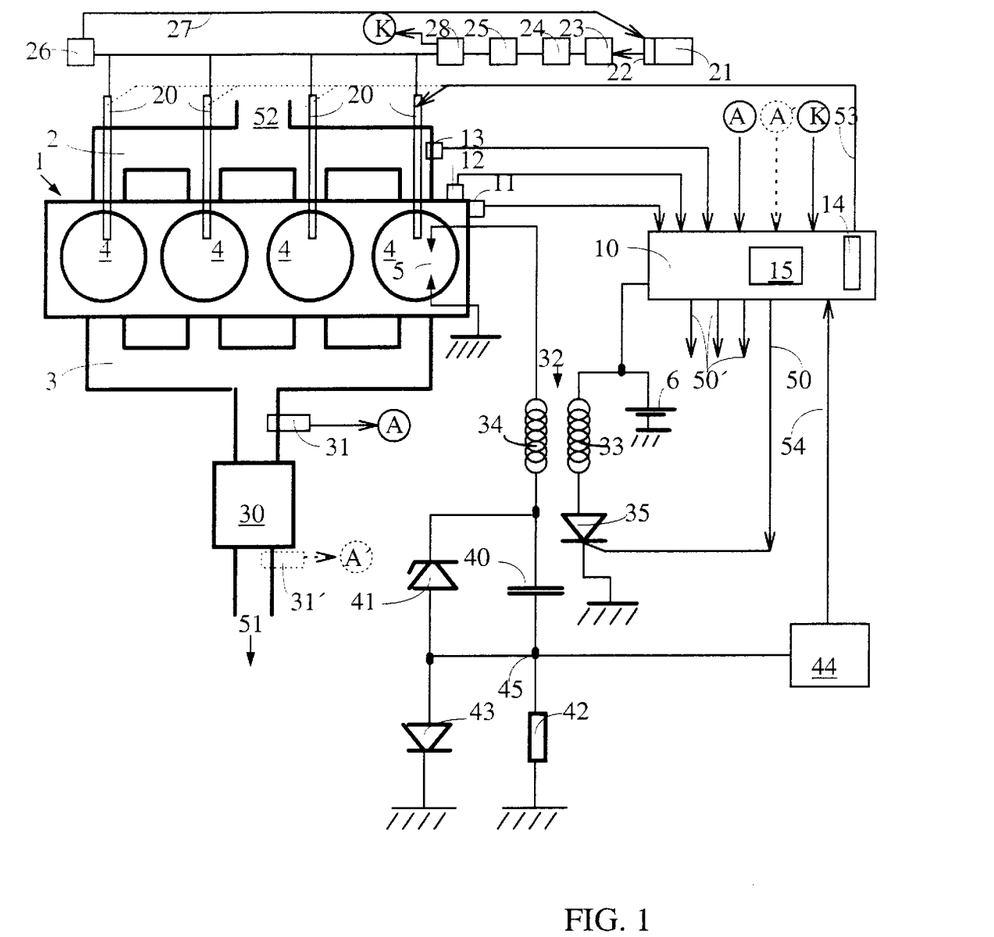
FIG. 1 shows schematically an arrangement for controlling a combustion engine and detection of the degree of ionisation within the combustion chamber.

In FIG. 1 is shown an arrangement for controlling a combustion engine 1. A fully electronic control system for the fuel supply as well as ignition timing for the combustion engine is shown. A microcomputer 10 controls the ignition timing as well as the amount on fuel supplied dependent of engine speed, engine temperature and load of engine, detected by the sensors 11, 12, 13 respectively. The sensor 11 is preferably a conventional type of pulse-transmitter, detecting cogs at the outer periphery of the flywheel. A positioning signal could also be obtained by the sensor 11, by one or some cogs having varying tooth width, alternatively tooth gap, at a stationary crankshaft position. The microcomputer 10 includes customary types of arithmetic unit 15 and memory 14, storing control algorithms, fuel maps and ignition timing maps.

At least one spark plug 5 is arranged in each cylinder 4, only one spark plug intended for a cylinder being shown in FIG. 1. The ignition voltage is generated in an ignition coil 31, having a primary winding 33 and a secondary winding 34. One end of the primary winding 33 is connected to a voltage source, a battery 6, and the other end is connected to ground via an electrically controlled switch 35.

A current starts to flow through the primary winding 33 when the control output 50 of the microcomputer 10 switches the switch 35 to a conductive state. When the current is cut out a step-up transformation of the ignition voltage will be obtained in the secondary winding 34 of the ignition coil 32 in a conventional manner, and an ignition spark will be generated in the spark gap 5.

Start and stop of the current flow, so called dwell-time control, is controlled dependent the present parameters of the engine and according to a pre-stored ignition map in the memory 14 of the microcomputer. Dwell-time control assures that the primary current reach the level necessary and that the ignition spark is generated at the ignition timing necessary for the present load case. One end of the secondary winding is connected to the spark plug 5, and the other end connected to ground includes a detector circuit detecting the degree of ionisation within the combustion chamber. The detector circuit includes a voltage accumulator, here in the form of a chargeable capacitor 40, which capacitor biases the spark gap of the ignition plug with a substantially constant measuring voltage. The capacitor is equivalent to the embodiment shown in EP,C,188180, where the voltage accumulator is a step-up transformed voltage from the charging circuit of a capacitive type of ignition system. In the embodiment shown in FIG. 1, the capacitor 40 is charged when the ignition pulse is generated, to a voltage level given by the break-down voltage of the zener diode 41. This break-down voltage could lie in the interval between 80–400 volts. When the stepped up ignition voltage about 30–40 kVolts is generated in the secondary winding, the zener diode breaks down which assures that the capacitor 40 not will be charged to a higher voltage level than the break-down voltage of the zener diode. In parallel with a measuring resistance 42 is a protecting diode 43 connected with reversed polarity, which in a corresponding manner protects against over voltages of reversed polarity. The current in the circuit 5-34-40/40-42-ground is detected at the measuring resistance 42, which current is dependent on the conductivity of the combustion gases in the combustion chamber. The conductivity in turn is dependent on the degree of ionisation within the combustion chamber.

By the measuring resistance 42 being connected close to ground only one connection to the measuring point 45 is necessary for a detector 44. The detector 44 measures the potential over the resistance 42 at measuring point 45 relative to ground. By analysing the current, alternatively the voltage, through the measuring resistance 42 a knocking condition or preignition as well as other conditions could be detected. As has been mentioned in U.S. Pat. No. 4,535,740 during certain operating cases the present air-fuel ratio could also be detected by measuring how long the ionisation current is above a certain level.

With a lambda sensor 31 arranged in the exhaust manifold of the combustion engine, as seen in the flow of exhaust upstream of a catalyst 30 arranged in the exhaust manifold, the residual amount of oxygen could be detected, and hence also the present mixture ratio of air-fuel. With a conventional narrow-banded lambda sensor, having an output signal with a distinct transition just below stochiometric mixtures, the fuel amount given from a stored fuel map could be corrected. The correction is made in order to maintain the ideal mixture ratio of air-fuel for the function of the catalyst 30. By the output signal A from the lambda sensor a feed back control of the fuel supply could be obtained, which control is performed in such a way that the output signal from the lambda sensor oscillates between a high and a low output signal up to a couple of times per second.

The fuel supply system of the combustion engine includes in a conventional manner a fuel tank 21 having a fuel pump 22 arranged in the tank. The pressurised fuel is supplied from the pump 22 to a pressure equaliser 23, and further on to a fuel filter 24 and other containers 25, or volumes, including the fuel rail. A pressure regulator 26 is arranged at one end of the fuel rail, which at exceeding pressures opens for a return flow in the return line 27, back to the fuel tank 21 or the fuel pump 22. An alternative to a pressure regulator 26 opening at excessive pressures could be a pressure controlled fuel pump, whereby the return line 27 could be avoided. The accumulated volumes of the fuel pump unit 22, the pressure equaliser 23, the fuel filter 24 and other cavities or volumes 25, are of such order that operation for a couple of minutes could take place before a new type of fuel being fuelled to the tank reaches the fuel injectors 20. The fuel injectors 20 are arranged such that they could inject fuel directly into each cylinder, and are operated sequentially in synchronism with the operating cycle of the engine. The amount of fuel supplied to a cylinder is determined by the length of the control pulse emitted by the microcomputer 10 to the associated fuel injector 20. The amount of fuel, as well as ignition timing, is controlled dependent present engine parameters according to prestored fuel- and ignition timing maps contained in the memory 14 of the microcomputer 10. The fuel amount given by the map could possibly be corrected by the lambda sensor output. In a certain type of fuel control system a fuel quality sensor 28 could also be arranged in the fuel supply system. The fuel control could with a fuel quality sensor 28 be adjusted to the present octane number or mixture ratio of methanol and petrol. The microcomputer 10 obtains an input signal K from the fuel quality sensor indicating the present fuel quality.

Figure 2A:
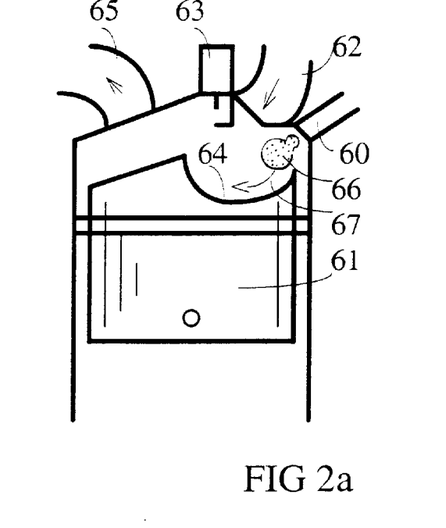
FIGS. 2a–2c show schematically how fuel is injected in an Otto-engine having a fuel injector located at an offset angle to the cylinder axis.
Figure 2B:
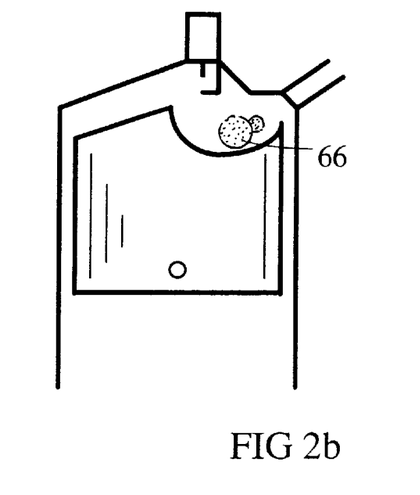
Figure 2C:
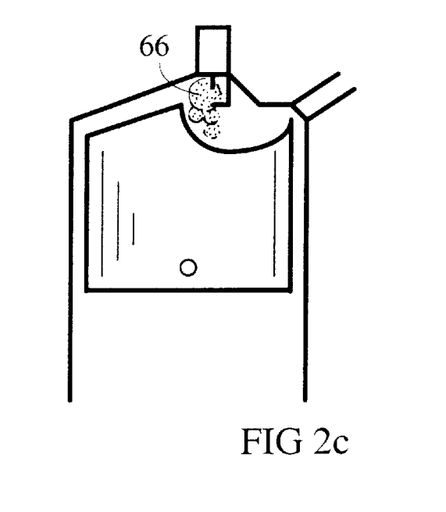

In the FIGS. 2a–2c are shown how fuel is injected into the cylinder of a direct injected Otto-engine having a fuel injector 60 located at an offset angle to the cylinder centre or axis. In this figure is shown a combustion chamber wherein the induced air motion inside the combustion chamber is of the "reversed thumble"-type, as indicated by arrow 67 in the figure. "Reversed thumble" is an air motion wherein the air induced into the combustion chamber is given a rotation around an axis perpendicular to the cylinder axis and directed downwards and towards the cylinder centre. This reversed thumble is obtained from an inlet manifold channel 62 having a radius in a vertical plane and around a centre located at an opposite side of the cylinder axis as seen in relation to the location of the seats of the inlet valves. With the object to strengthen the reversed thumble is also the piston is designed with a cup-shaped bowl 64, which will support the rotation and guide it towards the ignition plug 63. In FIG. 2a is shown how the injector 60 will deposit the fuel cloud initially in the cylinder, which could correspond to a position of the piston some 50 crankshaft degrees before top dead centre (BTDC, Before Top Dead Centre). Otto engines with direct injection will need an injector having substantially increased capacity, in relation to injectors used for indirect injection. The maximum amount of fuel needed should be able to be delivered within a very limited interval of time, which related to an engine could correspond to within some 10 degrees of crankshaft angles. The start of injection could then be initiated at a position before the position shown in FIG. 2a, i.e. some 60° BTDC. In FIG. 2b is shown a position in the working cycle of the Otto-engine wherein the fuel injection is completed, and where the fuel cloud begins to move within the combustion chamber under the influence of the induced rotation of air. FIG. 2b could correspond to an engine position at 45° BTDC. In FIG. 2c is shown a position in the working cycle of the engine wherein the fuel cloud 66 has had time to move such that the richest air-fuel mixture is obtained around the spark plug gap 63. By the expression fuel-cloud is meant the local volume within the combustion chamber wherein the proportion between air and finely dispersed fuel corresponds to a stochiometric or richer than stochiometric condition.

Figure 3A:
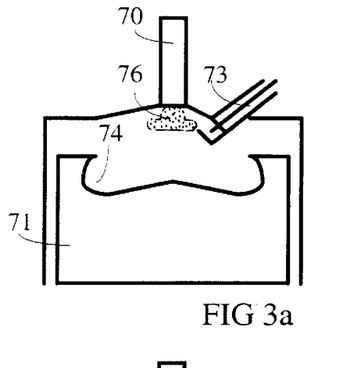
FIGS. 3a–3c show schematically how fuel is injected in an Otto-engine having a fuel injector located in the centre of the cylinder.
Figure 3B:
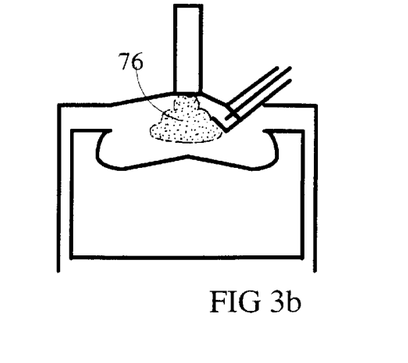
Figure 3C:
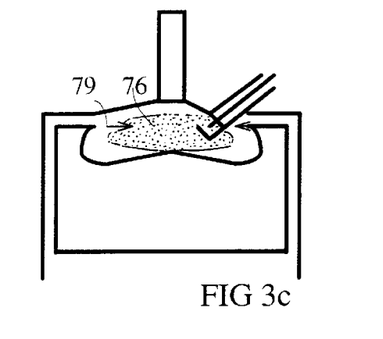

In the FIGS. 3a–3c are shown how fuel is injected into the cylinder of a direct injected Otto-engine having a fuel injector 70 located at the centre of the cylinder. In this embodiment a combustion chamber is used wherein the induced air is given a rotation in a horizontal plane, a so called "swirl", i.e. a rotation inside the combustion chamber around an axis in parallel with and most often coincident with the cylinder axis. This swirl could be obtained in a conventional manner by using an inlet manifold channel (not shown) having a radius around an axis in parallel with the cylinder axis. In order to further improve and support this swirl within the combustion chamber the piston 71 is designed with a cup shaped bowl with a shape being axially symmetrical with the cylinder axis. In FIG. 3a is shown how the injector 60 will deposit the fuel cloud initially in the cylinder, which could correspond to a position of the piston some 50 crankshaft degrees before top dead centre. In FIG. 3b is shown a position in the working cycle of the Otto-engine wherein the fuel injection is completed, and where the fuel cloud begins to rotate together with the horizontal rotation within the combustion chamber. FIG. 3b could correspond to an engine position at 45° BTDC. The induced rotation could to a certain degree restrict further distribution of fuel in the combustion chamber in the radial direction, and thus maintain the fuel within a restricted area in the centre of the combustion chamber. In FIG. 3c is shown a position in the working cycle of the engine wherein the fuel cloud 76 has had time to spread out within the induced rotation such that the fuel cloud reaches the ignition plug 73. In FIG. 3c is indicated by arrows 79 the squish-effect obtained when the upper surfaces of the piston approaches the cylinder roof. This squish effect appears during the final stages of the compression stroke, and could have an impact upon the positioning of the fuel cloud 76 in the combustion chamber in relation to the ignition plug arranged within the combustion chamber. A similar squish effect is also obtained with a combustion chamber as shown in FIGS. 2a–2c.

Figure 4:
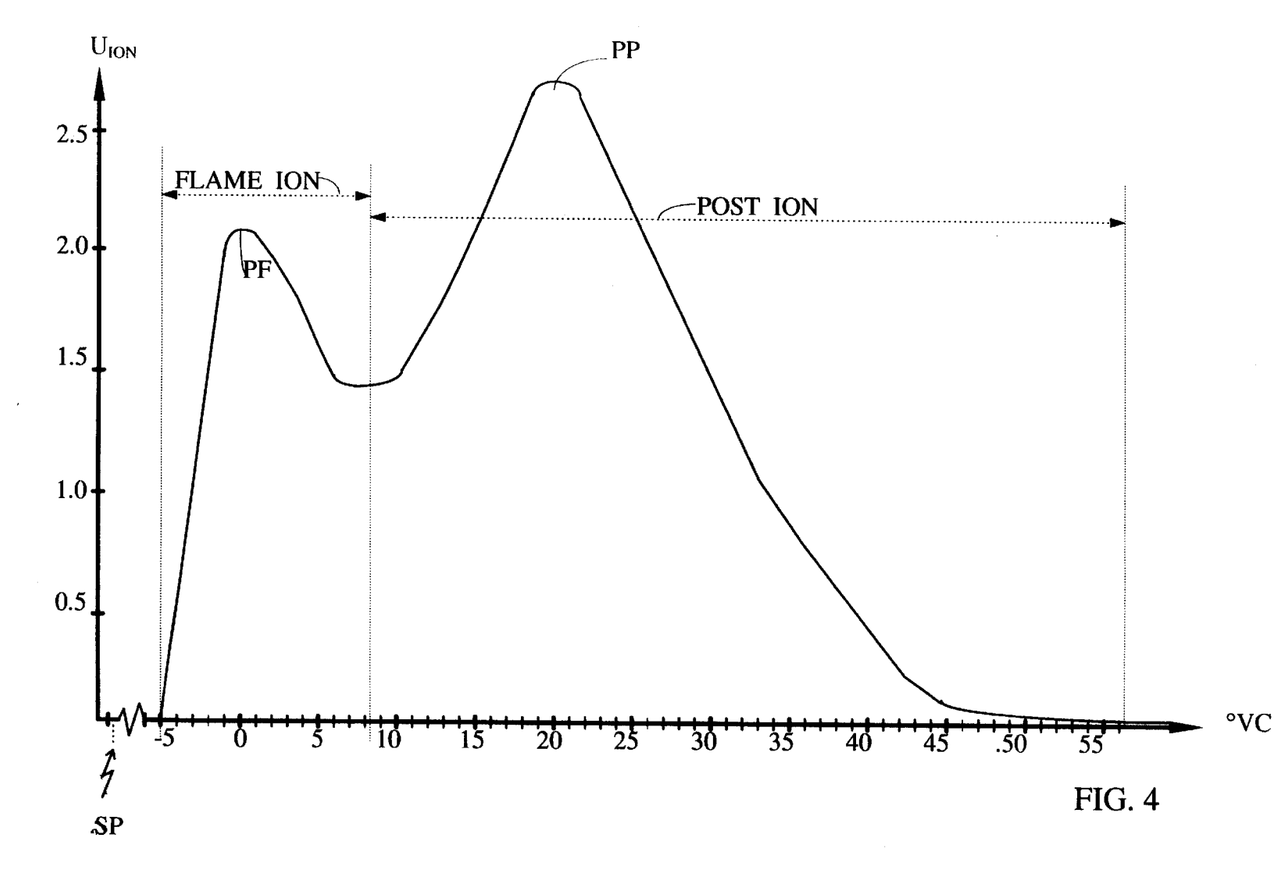
FIG. 4 shows schematically the appearance of the ionisation current signal as detected by an arrangement shown in FIG. 1.

In FIG. 4 is schematically shown the ion current signal $U_{ION}$ as obtained with a measuring arrangement according to FIG. 1. The signal level $U_{ION}$ measured in volts is shown at the Y-axis, and the output signal could lie in the range 0–2.5 volt. At the X-axis is shown crankshaft degrees °VC, where 0° denotes the upper dead position when the piston is occupying its uppermost position. At the position SP, which is a position before the upper dead position and preferably 15–20 crankshaft degrees before upper dead position, the ignition spark is generated at the ignition advance timing requested at the prevailing operating conditions, primarily dependent of load and rpm. The generation on the ignition spark induce a high measuring pulse in the detection circuit 40–45, caused by the spark discharge in the spark plug gap during the so called break down phase, but this high measuring pulse is filtered out, and the corresponding value is not used in the preferred embodiment. The collection of measured values is preferably controlled by the micro computer 10, in such a way that the micro computer only reads the signal input 54 at certain engine positions or at certain points of time, i.e. in defined measuring windows. These measuring windows are activated preferably dependent on the ignition timing SP, in order for these measuring windows to be opened a sufficiently long time after the spark discharge has attenuated properly.

After the break down phase the flame ionisation phase is initiated, in FIG. 4 denoted FLAME ION, during which phase the measuring voltage is affected by the establishment of a burning kernel of the air/fuel mixture in or near the spark plug gap.

After the flame ionisation phase the post ionisation phase is initiated, in FIG. 2 denoted as POST ION, during which phase the measuring voltage is affected by the combustion within the combustion chamber, which combustion cause an increase of the number of ionising particles at increasing temperature and combustion pressure. The typical behaviour is that a maximum value is reached during POST ION, denoted as PP in FIG. 4, when the combustion pressure has reached its maximum value and the flame front has reached the walls of the combustion chamber, which causes an increase in pressure.

The transition between the flame ionisation phase and the post ionisation phase and the peak values within each respective phase could preferably be detected by a differentiation circuit, or alternatively a differentiation algorithm implemented in the software of the control unit. The first zero crossing of the differential coefficient $dU_{ION}/dVC$ will detect the peak value PF, the second zero crossing of the differential coefficient will detect the transition between the flame ionisation phase and the post ionisation phase and the third zero crossing will detect the peak value PP.

In Otto-engines with direct injection where a stratification is wanted at the spark plug gap during certain operating conditions, i.e. a locally richer air-fuel mixture, the ionisation current signal will be influenced by the momentary positioning of the fuel cloud at the timing of ignition. Advantageously the characteristics of the ionisation current signal during the flame ionisation phase are used, which characteristics are directly dependent on the local air-fuel ratio at the spark plug gap.

Figure 5:
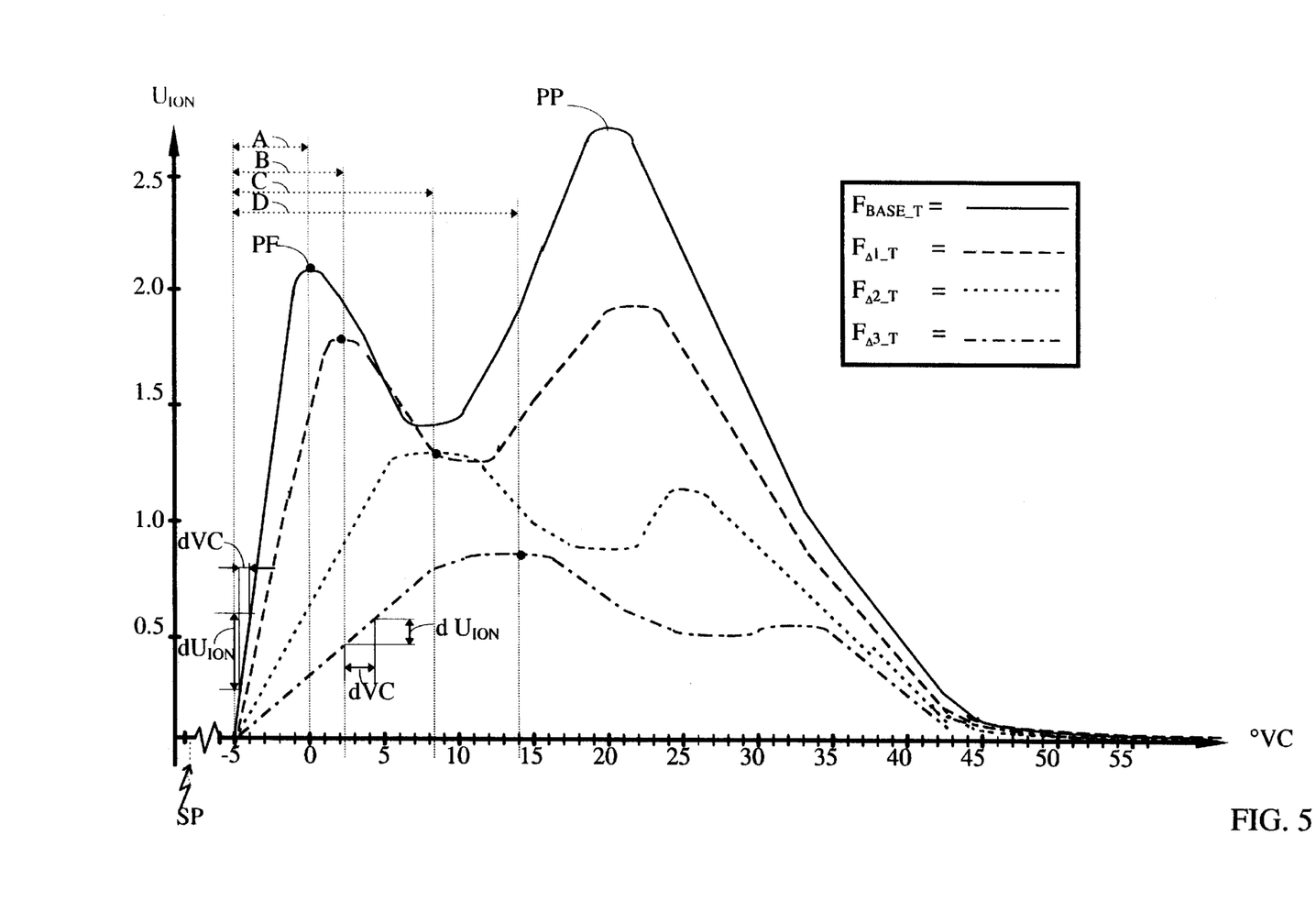
FIG. 5 shows different types of ion current signals obtained from combustions with different injection timings but with a constant amount of fuel.

In FIG. 5 is schematically shown different types of measuring signals as detected with a detection circuit as shown in FIG. 1, and obtained from combustions with differing injection timings but with other parameters kept constant, including identical amounts of fuel. The curves shown in FIG. 5 are typically obtained from operating cycles at 2000 rpm and averaged over 500 cycles. The non-broken curve, $F_{BASE\_T}$, shows combustions having an ideal injection timing. The dash marked curve, $F_{\Delta 1\_T}$, shows combustions having an injection timing having a small deviation $\Delta 1\_T$ in relation to the ideal injection timing. The dot marked curve shows combustions having a somewhat larger deviation $\Delta 2\_T$ in relation to ideal injection timing, and finally the dash.dot curve shows combustions having the largest deviation $\Delta 3\_T$ in relation to ideal injection timing. For all these curves is the absolute values of the deviations are related as; $\Delta 1\_T < \Delta 2\_T < \Delta 3\_T$. The voltage $U_{ION}$ representative for the ionisation current, after the break down phase, is sampled from 5 crankshaft degrees before the upper dead position (ÖD) and at least to about 55 crankshaft degrees after ÖD. The first break down phase, which occurs between the generation of the spark SP and before 5 crankshaft degrees before ÖD, is not included in the curves, which curves shows the flame ionisation phase (FLAME ION) and the post ionisation phase (POST ION). It is evident from the figures that the frequency characteristic of the fundamental frequency of the ion current signal during the flame ionisation phase has a maximum at an ideal injection timing $F_{BASE\_T}$. At an ideal injection timing, $F_{BASE\_T}$, then the measuring signal increases rapidly towards its peak value PF during the crankshaft angle range A. At successive alteration of the injection timing in steps $\Delta 1\_T \rightarrow \Delta 2\_T \rightarrow \Delta 3\_T$, away from the ideal injection timing, then the increase rate of the measuring signal will decline, and the respective peak values during the flame ionisation phase will be reached only after having passed the crankshaft angle ranges B, C and D respectively.

The frequency characteristic of the fundamental frequency of the measuring signal during the respective crankshaft range A, B, C and D of each curve, i.e. during a fourth of a complete signal period, will thus decrease with increased deviation from the ideal injection timing.

Another method for extracting the frequency characteristic of the fundamental frequency of the ion current signal is to observe the differential value $d_{ION}/dVC$, i.e. the voltage $U_{ION}$ as a function of the crankshaft angle VC. This could be done with the detector 44 shown in FIG. 1. With the relationship described above it has been shown that it is possible to optimise the fuel injection timing in a closed-loop manner, by detecting the first order frequency of the fundamental frequency of the ion current signal, or as it conveniently may be implemented in a control system by detecting $dU_{ION}/dVC$ during the flame ionisation phase.

Figure 6:
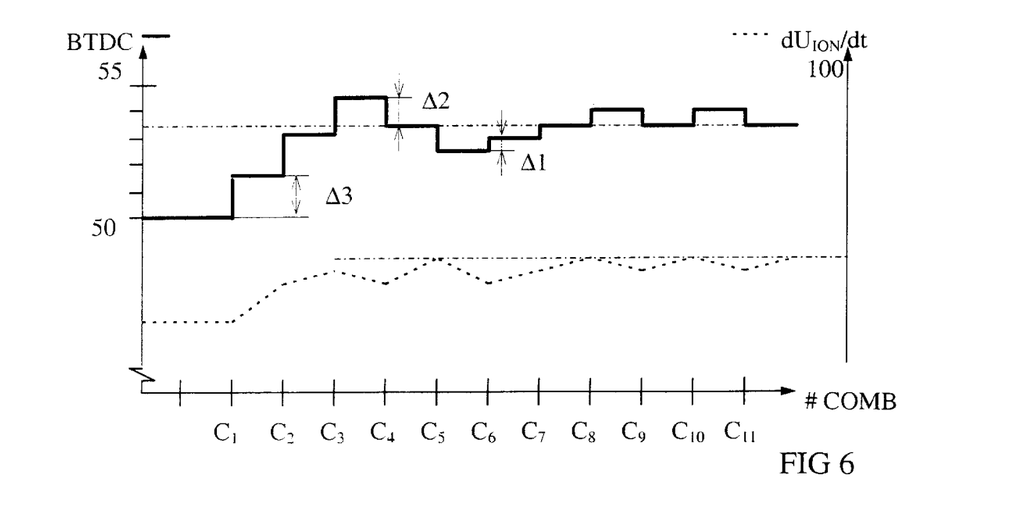
FIG. 6 shows how the inventive method could be implemented.

In FIG. 6 is shown how the inventive method could be implemented. With the bold curve is shown the momentary positioning of the injection timing in the working cycle of the engine. The positioning of the injection timing is indicated at the vertical axis on the left, and indicated in crankshaft degrees before top dead centre, BTDC, whereby an increasing value of BTDC indicates an earlier injection. With the dotted curve is shown the momentary value of the differential value of the ionisation current signal, $d_{ION}/dt$, during the flame ionisation phase. Before the variation of the positioning of the injection timing is initiated, i.e. before the combustion number $C_1$, a positioning according to an empirically determined map could be used, in this case 50° BTDC. When a steady-state condition has been obtained the variation of the positioning of the fuel injection is initiated. This variation could be implemented by an advance in time of the fuel injection in predetermined steps, $\Delta 3$, which could correspond to 1.5 crankshaft degrees. A steady-state condition could be assumed when the load and engine rpm fluctuates less than 5%, and preferably less than 1% between successive combustions. If then the value of $dU_{ION}/dt$ indicates a tendency to increase, another incremental advance of the injection timing at the same order. i.e. $\Delta 3$, could yet be initiated at the combustion number $C_2$. If the incremental advance at the initial order brings about a decrease of $dU_{ION}/dt$, which occurs at the combustion number $C_3$, then the variation of the positioning of the fuel injection changes from an advance to a retard direction, which occurs at combustion number $C_4$. At each change of direction, i.e. from advance to retard and vice versa, the order of advance or retard, i.e. the step-rate, could be reduced from the initial step $\Delta 3$ to the step $\Delta 2$, in order to find the positioning obtaining the maximum value of $dU_{ION}/dt$ in a fast and correct manner. $\Delta 2$ could correspond to 1.0 crankshaft degrees. If the retarded injection timing at combustion number C4 bring about an increase of $dU_{ION}/dt$, then the variation of the injection timing in the retard direction continues at combustion number $C_5$ with the same retard step as implemented at combustion number $C_4$. If the retarded injection timing bring about a decrease of $dU_{ION}/dt$, then the variation of the injection timing changes once again from retard to advance, and the step rate of variation is decreased from $\Delta 2$ to $\Delta 1$. $\Delta 1$ could correspond to 0.5 crankshaft degrees. Preferably a lower limit for the step rate is used, where $\Delta 1$ could be the smallest step rate used during variation of the positioning of the fuel injection.

When the variation has reached the smallest allowable step rate, then the ideal condition is obtained with a continuous change between retard and advance, and wherein the value of $dU_{ION}/dt$ continuously changes between an increasing or decreasing tendency. When a predetermined number of changes, in the order of some tens, between retard and advance have occurred in the specific operating state, the variation is terminated and the positioning found is stored permanently in a memory of the engine control system as the positioning to be used for the prevailing operating state. By this method could an adaptation of the fuel map be made for all steady state conditions. Because this map is the base also for fuel injection control during transients, i.e. during changes in load or engine rpm, also an adaptation of transient fuel control is obtained.

The above described variation could preferably be initiated once again for each specific operating state of the engine, after having reached a minimum predetermined time of operation at this specific operating state. This predetermined operating time could be set to some minutes up to some hours, which predetermined operating time will establish the limitations for how often the engine will adapt to any changes. Alternatively different types of alarms could initiate a variation of the injection timing when a steady-state condition has been assumed. Such an alarm could as an example constitute fault indications from different type of sensors, such as lambda sensors or HC-sensors, which could indicate excessive levels of emissions or irregular combustion.

In FIG. 6 is shown that the differential value of the ionisation current signal, $dU_{ION}/dt$, does not exhibit a jumping change at an initiated incremental change of the positioning. Preferably a running average of $dU_{ION}/dt$ is implemented, which will lead to that the averaged value $dU_{ION}/dt$ only gradually will assume an increased value if a number of consecutive combustions all exhibit an increased value of $dU_{ION}/dt$. This is advantageous when implemented in Otto engines, where the combustion process fluctuates to a great extent between consecutive combustions.

A problem with a stratified air-fuel mixture, i.e. a richer mixture locally in the vicinity of the spark plug gap, is that the spark plug gap could be covered with soot. This is often the case in Otto engines with direct injection, wherein the fuel cloud could cause an excessively rich air-fuel mixture in the spark plug gap. During certain operating cases the preferred set point value of the ionisation characteristic signal could correspond to a predetermined part of the maximum basic frequency content. In this manner a controlled initiation of ignition could be implemented before the excessively rich areas of the fuel cloud reaches the spark plug gap.

The variation of the injection timing could also be combined with a step-by-step decrease of the fuel amount, if the ionisation characteristic signal indicates an excessive basic frequency, which could enable further decrease of the fuel amount. During stratified operation without feed-back, then the predetermined amount of fuel must be set to a sufficient amount of fuel that will guarantee a safe and reliable ignition of the air-fuel mixture in all operating cases. This could result in optimal air-fuel mixtures in the spark plug gap during specific operating cases, but also excessively rich mixtures in other operating cases. Another problem is that stratified operation with an extreme lean mixture, as seen in the entire combustion chamber, leads to very low combustion temperatures. A basic rule is that the spark plug should be maintained at a temperature above 400° C. which is the lowest temperature obtaining a self cleaning effect of the spark plug be avoiding build up of soot on the electrodes. An advantage with an ignition system, as shown FIG. 1, is that any soot coating could be detected with the measuring circuits. The bias voltage applied on the spark plug gap could give an offset value of the ionisation signal, corresponding to a superposed DC-signal. The order of the DC-signal is directly dependent on the amount of soot covering the spark plug. When soot starts to build up upon the spark plug gap and the insulator surrounding the centre electrode, then the resistance in the spark plug gap will decrease. This DC-signal could thus be used to correct the injection timing such that soot build up is under control, i.e. will not allow a DC-signal above a certain threshold to be generated.

The variation of the injection timing could also be combined with other measures having the object of reducing soot build up. As an example the ignition timing could also be advanced during a limited number of combustions in order to provoke extreme temperatures, possibly also some knocking. A switch-over from a stratified operation to a homogenous air-fuel mixture, with a stochiometric combustion throughout the entire combustion chamber, could also be implemented as a complement if the variation of the injection timing during stratified operation is not sufficient in order to reduce soot build-up.

In the embodiment shown a detection of the ionisation is made immediately after termination of the ignition spark in the spark plug gap. Alternative solutions could instead use a signal characteristic for the ionisation during the breakdown phase or the discharge phase of the ignition spark. Such a signal could be obtained from the bias voltage necessary for maintaining the ignition spark during the discharge phase. Another alternative could instead detect the ignition current of the ignition spark.

The invention is not limited to detection of the fundamental frequency or the differential value. The invention could within the scope of the claims be modified in such a manner that a parameter characteristic for a frequency content of the fundamental frequency, for example, could imply a detection of how rapidly the amplitude maximum PF during the flame ionisation phase occurs. A simple detection of the time for the occurrence of the amplitude maximum is strictly dependent on the differential value $dU_{ION}/dt$, and thus characteristic for the fundamental frequency.

The preferred embodiment, having a measuring window during the flame ionisation phase before the amplitude maximum PF, is however the easiest embodiment which could be implemented in a control system, because this phase is relatively unambiguously determined dependent on the ignition timing event.

The invention is not limited to Otto engines with direct injection, where a stratification of a relatively richer air-fuel mixture in the vicinity of the spark plug is initiated during especially low-and part-load operation of the engine. The invention could also be implemented in Otto-engines using indirect fuel injection, i.e. fuel injection into inlet channels, and where a stratification could be obtained by controlled activation of the inlet valves. This could by way of example be obtained by injecting fuel only towards one inlet valve guiding a part of the induced air towards the ignition plug, and where the major part of the induced air is guided into the cylinder by another inlet valve. The invention could also be implemented with different types of ignition plugs. As an example conventional spark plugs with air-gaps or surface spark plugs could be used, as could surface spark plugs causing the discharge to occur over a insulator surface be used.

The usage of the spark plug as a measuring gap for ionisation detection has the advantage that an additional measuring gap in the combustion chamber is not needed. The invention is however not limited to ionisation detection via the spark plug gap. Alternatively an additional measuring gap could be arranged in the combustion chamber, either integrated into the spark plug and in parallel with the spark gap, or with an additional measuring gap separated from the spark plug.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A method for closed-loop control of the positioning of a predetermined amount of fuel in the working cycle of a combustion engine of the Otto-type, wherein the predetermined amount of fuel is supplied to a combustion chamber via an injector, and wherein the ignition of the air-fuel mixture is initiated with a spark plug arranged in the combustion chamber, which method comprises:

detecting a parameter representative of ionization within the combustion chamber; and varying the positioning of the predetermined fuel amount in the working cycle in predetermined steps in either an advance or retard direction, such that a value of the parameter representative of the ionization within the combustion chamber changes towards a desired value.

2. The method according to claim 1, wherein the parameter representative of ionization is detected by a measuring gap arranged inside of the combustion chamber.

3. The method according to claim 2, wherein a gap of the spark plug serves as the measuring gap.

4. The method according to claim 1, wherein the detected parameter is a characteristic of an ionization signal and the desired value constitutes the maximum value of the characteristic for a basic frequency of the ionization signal during at least a part of a flame ionization phase.

5. The method according to claim 1, wherein the detected parameter is a characteristic of an ionization signal and the desired value constitutes a predetermined acceptance interval within which interval the peak value of the ionization signal occurs after initiation of ignition.

6. The method according to claim 4, wherein the detected parameter is a first order derivative value of the ionization signal within a measuring window during the flame ionization phase.

7. The method according to claim 6, wherein the detection of the first order derivative of the ionization signal is made before the ionization signal reaches its peak value during the flame ionization phase.

8. The method according to claim 1, wherein the combustion engine is equipped with injectors having a variable dynamic response whereby the amount of fuel being supplied per time unit is controllable and wherein the variation of the positioning of the fuel is combined with a change of flow rate in an injector, either by switching between variation of positioning or variation flow rate control during a predetermined number of cycles or switching between each combustion, and wherein the variation of the flow rate of the injector is effected such that the value of the parameter representative of the ionization within the combustion chamber changes toward the desired value.

9. The method according to claim 1, wherein the variation of the positioning of the predetermined fuel amount is initiated when the engine is subjected to an essentially constant load and speed.

10. The method according to claim 9, wherein the engine is considered to be at an essentially constant load and speed when the load and speed of the engine fluctuates less than 5% between successive combustions.

11. The method according to claim 10, wherein the variation of the positioning of the predetermined fuel amount is initiated in a specific operating mode, as indicated by engine speed and load, after a predetermined operating time has passed in the specific operating mode since a variation was last initiated.

12. The method according to claim 11, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

13. The method according to claim 11, wherein the positioning is changed at a step rate and the step rate is decreased between each change between a retarded and advanced fuel injection timing.

14. The method according to claim 10, wherein the variation of the positioning of the predetermined fuel amount is initiated when indicated by engine load and speed and when an alarm function associated with an emission level indicates excessive levels of the emissions or a fluctuating and unstable combustion.

15. The method according to claim 14, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

16. The method according to claim 14, wherein the positioning is changed at a step rate and the step rate is decreased between each change between a retarded and advanced fuel injection timing.

17. The method according to claim 9, wherein the engine is considered to be at an essentially constant load and speed when the load and speed of the engine fluctuates less than 1% between successive combustions.

18. The method according to claim 17, wherein the variation of the positioning of the predetermined fuel amount is initiated in a specific operating mode, as indicated by engine speed and load, after a predetermined operating time has passed in the specific operating mode since a variation was last initiated.

19. The method according to claim 18, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

20. The method according to claim 18, wherein the positioning is changed at a step rate and the step rate is decreased between each change between a retarded and advanced fuel injection timing.

21. The method according to claim 17, wherein the variation of the positioning of the predetermined fuel amount is initiated when indicated by engine load and speed and when an alarm function associated with an emission level indicates excessive levels of the emissions or a fluctuating and unstable combustion.

22. The method according to claim 21, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

23. The method according to claim 21, wherein the positioning is changed at a step rate and the step rate is decreased between each change between a retarded and advanced fuel injection timing.

24. The method according to claim 9, wherein the variation of the positioning of the predetermined fuel amount is initiated in a specific operating mode, as indicated by engine speed and load, after a predetermined operating time has passed in the specific operating mode since a variation was last initiated.

25. The method according to claim 24, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

26. The method according to claim 24, wherein the positioning is changed at a step rate and the step rate is decreased between each change between a retarded and advanced fuel injection timing.

27. The method according to claim 9, wherein the variation of the positioning of the predetermined fuel amount is initiated when indicated by engine load and speed and when an alarm function associated with an emission level indicates excessive levels of the emissions or a fluctuating and unstable combustion.

28. The method according to claim 27, wherein the variation of the positioning of the predetermined fuel amount is terminated for the specific operating mode when the variation of the injection timing changes between a retarded and an advanced position a predetermined number of times, after which the injection timing at the time of termination is stored as a permanent positioning in the working cycle of the engine for the fuel amount and for said specific operating mode.

29. The method according to claim 27, wherein the positioning is changed at a step rate and the step rate is decreased between each change between a retarded and advanced fuel injection timing.

* * * * *